C. T. WESTLAKE.
TRAILER TRUCK FOR LOCOMOTIVES.
APPLICATION FILED SEPT. 5, 1919.
1,378,203.
Patented May 17, 1921.
3 SHEETS—SHEET 3.
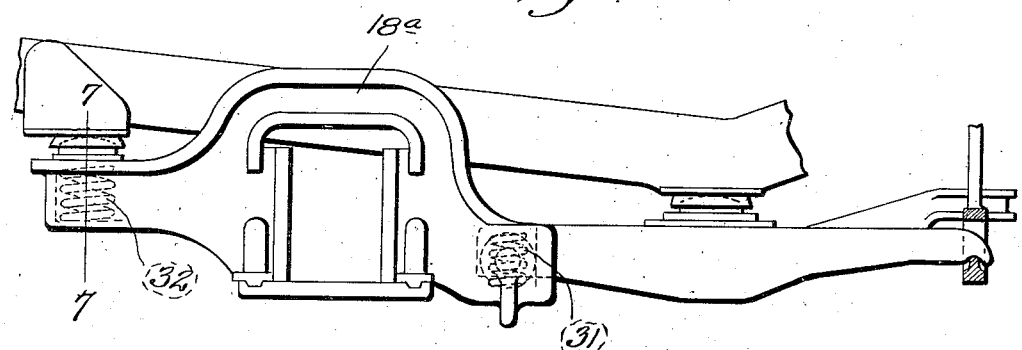
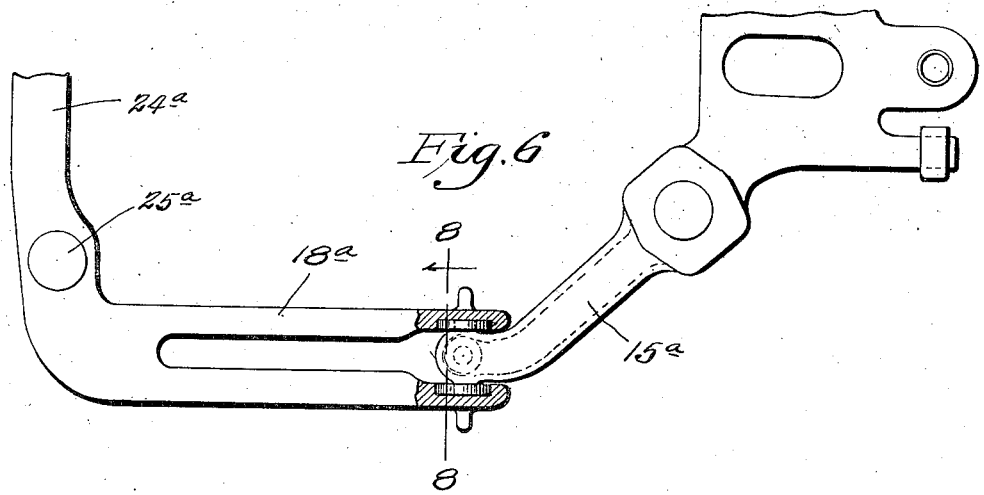
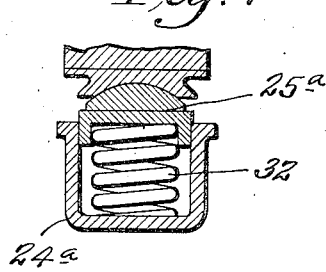
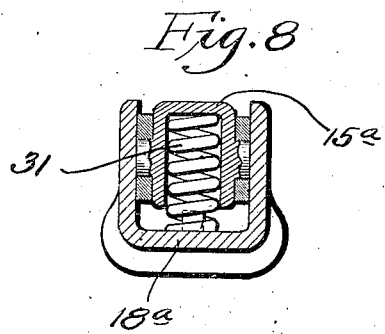
Inventor
Charles T. Westlake

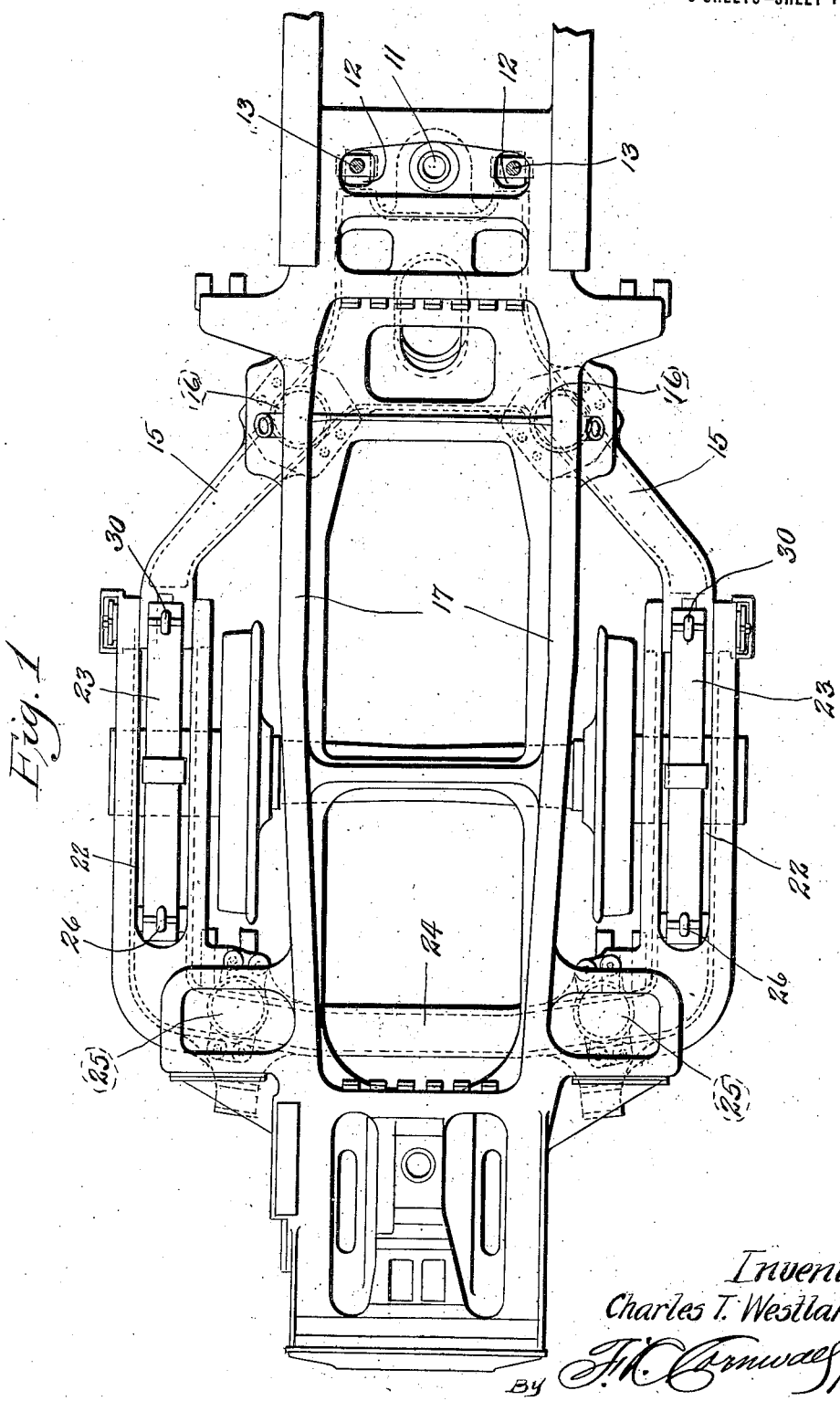

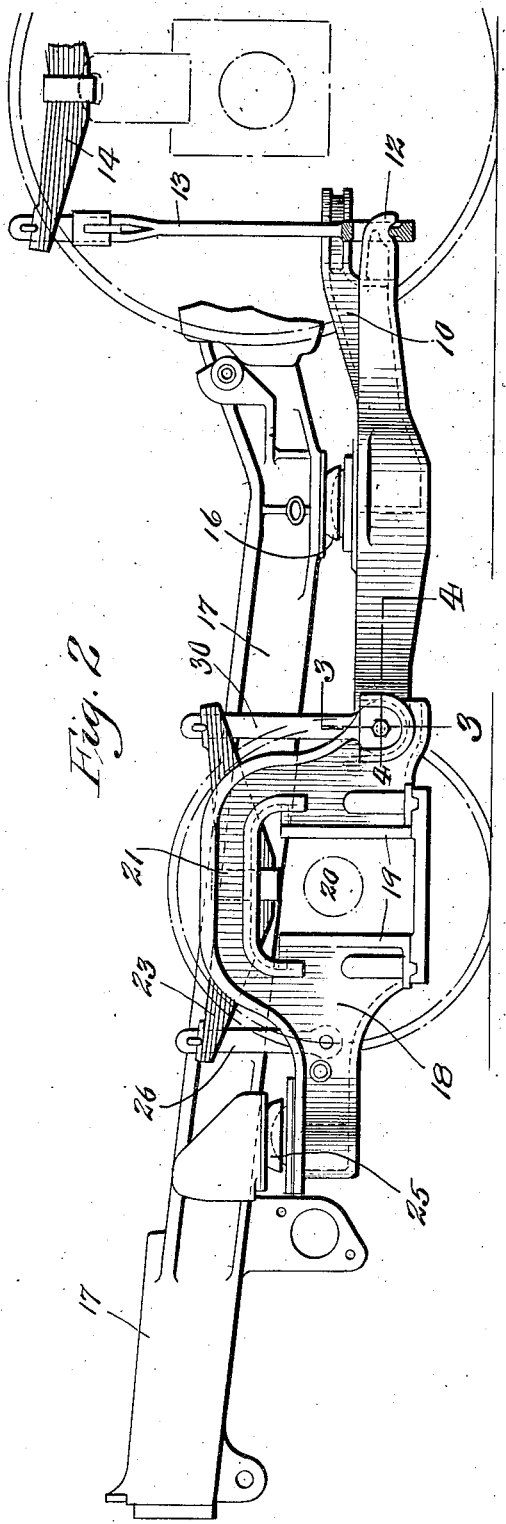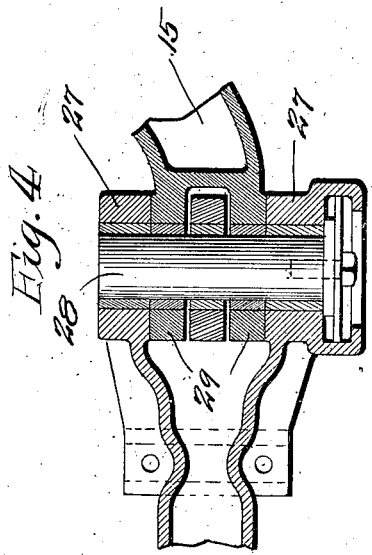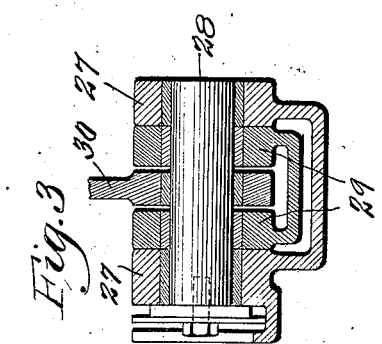

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER-TRUCK FOR LOCOMOTIVES.

1,378,203.	Specification of Letters Patent.	Patented May 17, 1921.

Application filed September 5, 1919. Serial No. 321,865.

*To all whom it may concern:*

Be it known that I, CHARLES T. WESTLAKE, a citizen of the United States, residing at the city of St. Louis, State of Missouri, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification.

My invention relates generally to trailer trucks for locomotives and more particularly to the type of trailer truck disclosed in United States Letters Patent No. 1,099,376, dated June 9th, 1914, No. 1,160,874, dated November 16th, 1915, and No. 1,210,124, dated December 26th, 1916.

The principal objects of my invention are to generally improve upon and simplify the construction of trucks disclosed in the patents aforesaid as well as other existing types of trailer trucks; to provide a trailer truck having a relatively high degree of flexibility so that it will be yielding in action while in service; to form a trailer truck frame in two main parts, one of which combines with springs carried by the trailer truck journal boxes in forming an equalizer to support a portion of the weight of the locomotive, and further to provide a trailer truck frame wherein the rear portion or that portion which carries the trailer truck axle is capable of pivotal movement about said axle, which latter arrangement is effective in materially increasing the flexibility of the entire structure.

With the foregoing and other objects in view, my invention consists in certain novel features of construction and arrangement of parts, hereinafter more fully described and claimed, and illustrated in the accompanying drawings, in which—

Figure 1 is a top plan view of a trailer truck frame of my improved construction and showing the same associated with a part of the locomotive frame.

Fig. 2 is a side elevational view of the trailer truck frame and showing the locomotive frame supported thereby.

Fig. 3 is an enlarged vertical section taken approximately on the line 3—3 of Fig. 2.

Fig. 4 is an enlarged horizontal section taken approximately on the line 4—4 of Fig. 2.

Fig. 5 is a side elevational view of a modified form of my improved trailer truck frame.

Fig. 6 is a plan view partly in section of a modified construction.

Fig. 7 is an enlarged detail section taken approximately on the line 7—7 of Fig. 5.

Fig. 8 is an enlarged cross section taken approximately on the line 8—8 of Fig. 6.

Referring by numerals to the accompanying drawings which illustrate a practical embodiment of my invention, 10 designates the front end portion of the main member of the truck frame, said front end portion being preferably cast and of substantially box like shape reinforced with webs or flanges, as desired, and the forward end of this front end portion is provided with a vertically disposed bearing 11 which is adapted to receive a pin (not shown) and which latter serves as an axis for the lateral swinging movement of the entire truck frame.

Formed integral with the front end of the body 10 and at the sides thereof are forwardly projecting brackets 12 which serve as points of connection for the lower ends of hangers 13, the upper ends of the latter being suspended from the rear ends of the rear driver springs 14.

Formed integral with or fixed to the rear portion of the body 10 are rearwardly projecting diverging rails or members 15, the same being either box shape or of inverted channel shape in cross section. Positioned on top of these rails 15, near their forward ends or the points where they unite with the front body portion 10, are friction pads 16 which serve as bearings for the main portion of the rear member 17 of the locomotive frame.

These friction pads are constructed so as to permit the front portion 10 of the truck frame to shift laterally beneath the locomotive frame rear member 17.

The rear portion of the trailer truck frame comprises a pair of inverted U-shaped members 18, the inner portions of the vertical legs of which constitute pedestals 19 for the trailer truck journal boxes (not shown) and which latter receive the ends of the trailer truck axle 20.

The upper or horizontal portions 21 of the side members 18 are provided with longitudinally disposed openings 22 in order to receive half-elliptic springs 23, the same being supported upon the trailer truck journal boxes.

Formed integral with or rigidly fixed to the rear ends of side members 18 are the ends of a transversely disposed rail 24, which is either box or of inverted U-shape in cross section and arranged on top of this rail near its ends are friction pads 25, the same serving as bearings for the rear portion of locomotive frame 17 and permitting the rear portions of the truck frame to shift laterally beneath said frame 17. Hangers 26 are suspended from the rear ends of the trailer truck springs 23 and the lower ends of said hangers are pivotally connected to the rear portions of side members 18.

Formed integral with the lower portions of the front legs of side members 18 are forwardly projecting bearings 27, the same being spaced apart and seated in each pair of the bearings is a horizontally disposed pin 28. The rear ends of the members 15 of the front and main frame are bifurcated vertically to form spaced bearings 29 which occupy positions inside the bearings 27 and receive pin 28.

Loosely arranged on each pin 28 between the pair of bearings 29 is the lower end of a hanger 30, the upper end thereof being suspended from the forward end of the corresponding trailer truck spring 23.

By virtue of the construction thus described the front and rear parts of the trailer truck frame have independent movement with respect to each other, the axis of movement of the two parts being upon the horizontally disposed pins 28, and as the rear part of the frame carries, and to a certain extent is supported by, the trailer truck axle 20, said rear frame in its movement tends to rotate about said axle.

In addition to this rotary movement, the rear portion of the frame can move vertically with respect to the axle by virtue of the fact that the springs 23 are mounted upon the trailer truck journal boxes and said springs necessarily yield under the weight of the supported load and likewise, as the trailer truck wheels pass over slight elevations or depressions in the track rails.

The forward end of the trailer truck frame is pivotally connected so that the rear portion of said frame can swing laterally upon curved portions of the track and said forward end is also yieldingly suspended from the rear driver springs of the locomotive.

The front portion of the trailer truck frame in combination with the springs 23 constitute and perform the functions of an equalizer for supporting a portion of the load carried by frame 17 and in action this equalizer tends to swing upon the axis formed by the trailer truck axle 20.

While I have shown two main parts of the trailer truck frame as being each formed in a single piece, it will be readily understood that said parts may be formed of separate and properly assembled pieces.

The modified construction illustrated in Figs. 5 to 8, inclusive, is particularly designed to occupy a smaller vertical space than the construction heretofore described, and in this modified form, the half-elliptic springs 23 carried by the trailer truck journal boxes are dispensed with and a compression spring 31 of proper tension is arranged between the rear end of each member 15$^a$ of the front part of the truck frame and the front end of each portion 18$^a$ of the rear frame (see Fig. 8.)

In this modified construction, the rear friction plates or pads 25$^a$ are yieldingly supported by compression springs 32, the latter being arranged in suitable pockets in the rear member 24$^a$ of the rear portion of the truck frame. This arrangement provides the necessary flexibility in the trailer truck frame and likewise the necessary resiliency of support for the locomotive frame and at the same time the entire arrangement occupies a relatively small vertical space.

A trailer truck frame of my improved construction is comparatively simple, has a relatively high degree of flexibility and consequently materially reduces truck frame stresses which are ordinarily developed in service, and said frame is strong and durable, relatively light in weight and very effective in performing its intended functions.

It will be readily understood that minor changes in the size, form and construction of the various parts of my improved trailer truck frame may be made and substituted for those herein shown and described without departing from the spirit of my invention, the scope of which is set forth in the appended claims.

I claim:

1. A trailer truck frame comprising two main parts which are pivotally connected to each other, the forward portion of the front part being adapted to be pivoted to the main frame of a locomotive, and a wheel carrying axle journaled in the rear part of said trailer truck frame.

2. A trailer truck frame comprising two main parts which are pivotally connected to each other, the forward portion of the front part being adapted to be pivoted to the main frame of a locomotive, a wheel carrying axle journaled in the rear part of said trailer truck frame, and said front and rear parts serving as supports for a part of the locomotive frame.

3. A trailer truck frame comprising two main parts pivotally connected to each other, a wheel carrying axle journaled in the rear part of the frame, and means whereby the rear part of the frame is flexibly supported by said axle.

4. A trailer truck frame comprising two main parts pivotally connected to each other, a wheel carrying axle journaled in the rear part of the frame, means whereby the rear part of the frame is flexibly supported by said axle, and bearings upon the two parts of said frame for a part of the locomotive frame.

5. A trailer truck frame comprising a front part and a rear part said parts being pivotally connected, journal boxes carried by the rear part, springs supported by said journal boxes, and connections from said springs to parts of the trailer truck frame.

6. A trailer truck frame comprising a front part and a rear part said parts being pivotally connected, journal boxes carried by the rear part, springs supported by said journal boxes, connections from said springs to parts of the trailer truck frame, and supports upon said front and rear parts for a part of the locomotive frame.

7. A trailer truck frame for locomotives comprising a front portion having diverging side members, a rear portion having side members, the rear ends of the diverging members of the front portion being pivotally connected to the front ends of the side members of the rear portion, and a wheel carrying axle upon which the rear portion of the frame is yieldingly supported.

8. A trailer truck frame for locomotives comprising a front portion having diverging side members, a rear portion having side members, the rear ends of the diverging members of the front portion being pivotally connected to the front ends of the side members of the rear portion, a wheel carrying axle upon which the rear portion of the frame is yieldingly supported, and bearings upon said front and rear portions for a part of the locomotive frame.

9. The combination with a locomotive and its frame, of a trailer truck frame pivotally connected near its forward end to the locomotive frame, said trailer truck frame being formed in two parts, a wheel carrying axle upon which the rear one of the trailer truck frame parts is yieldingly supported, and the two parts of the trailer truck frame being pivotally connected so as to permit the rear part to rock with the carried axle as an axis.

10. A trailer truck frame comprising two main parts, the front part being composed of a pair of diverging members united at their forward ends and the rear part comprising a pair of connected side members in which are formed journal box openings, and the rear ends of the diverging members of the front part being pivotally connected to the side members of the rear part.

11. A trailer truck frame comprising two main parts, the front part being composed of a pair of diverging members united at their forward ends and the rear part comprising a pair of connected side members in which are formed journal box openings, the rear ends of the diverging members of the front part being pivotally connected to the side members of the rear part, and bearings on said front and rear parts for a part of the locomotive frame.

12. A trailer truck frame comprising a front part and a rear part which parts are pivotally connected to each other, journal boxes carried by the rear part, a wheel carrying axle having its ends arranged in said journal boxes, springs supported by said journal boxes, connections between the rear ends of said springs and the rear part of the truck frame, and connections from the forward ends of said springs to the points of pivotal connection between the front and rear parts of the frame.

13. A trailer truck frame comprising a front part and a rear part which parts are pivotally connected to each other, journal boxes carried by the rear part, a wheel carrying axle having its ends arranged in said journal boxes, connections between the rear ends of said springs and the rear part of the truck frame, connections from the forward ends of said springs to the points of pivotal connection between the front and rear parts of the frame, and supports on said front and rear parts for the locomotive frame.

14. In a trailer truck, a wheel carrying axle, a truck frame rear member yieldingly supported thereupon, and a truck frame forward member flexibly connected to said rear member.

15. In a trailer truck, a wheel carrying axle, a truck frame rear member yieldingly supported thereupon, a truck frame forward member flexibly connected to said rear member, and said front and rear members being provided with supports for a locomotive frame.

16. The combination with a locomotive and its frame, of a wheel carrying axle, a trailer truck rear frame yieldingly supported upon said axle, a trailer truck front member flexibly connected to said rear member, the forward end of said front member being pivotally connected to a part of the locomotive whereby the entire trailer truck frame has lateral swinging movement and said front and rear members being adapted to support a part of the locomotive frame.

17. The combination with a locomotive and its frame, of a wheel carrying axle, a trailer truck rear frame supported upon said axle, a trailer truck front member flexibly connected to said rear member, the forward end of said front member being pivotally connected to a part of the locomotive whereby the entire trailer truck frame has lateral swinging movement and said front and rear members being adapted to support a part of the locomotive frame.

18. The combination with a locomotive and its frame, of a wheel carrying axle, a trailer truck frame supported upon said axle, yielding means on said truck frame and located to the rear of said axle for supporting a part of the weight of the locomotive, and yielding means on said truck frame located forward of said axle for supporting a part of the weight of the locomotive, said trailer truck frame being jointed for pivotal movement at a point between said yielding means.

19. The combination with a locomotive and its frame, of a wheel carrying axle, a trailer truck frame supported above said axle, yielding means on said truck frame and located to the rear of said axle for supporting a part of the weight of the locomotive, and an equalizer arranged to transmit a part of the weight of the locomotive to the truck frame at a point forward of said axle, said equalizer being pivotally connected at its rear end to the trailer truck frame and forming a forward extension thereof.

20. A trailer truck frame comprising two main parts which are pivotally connected to each other, the forward portion of the front part being adapted to be pivoted to the main frame of a locomotive, a wheel carrying axle journaled in the rear part of said trailer truck frame, and which yielding means includes an equalizer that is connected to the main equalizing system of the locomotive.

21. A trailer truck frame for locomotives comprising a front member, a rear member, said members being connected so that one member is capable of independent vertical movement with respect to the other, a wheel carrying axle journaled in the rear member, and bearings on said members to the rear and in front of the wheel carrying axle for the locomotive frame.

22. A trailer truck frame for locomotives comprising a front member, a rear member, said members being connected so that one member is capable of independent vertical movement with respect to the other, a wheel carrying axle journaled in the rear member, bearings on said members to the rear and in front of the wheel carrying axle for the locomotive frame, and the forward portion of the front member being yieldingly connected to the locomotive frame.

23. A trailer truck frame for locomotives comprising a front member and rear member, said members being connected so that one member is capable of independent vertical movement with respect to the other, a wheel carrying axle journaled in the rear member, bearings on said members to the rear and in front of the wheel carrying axle for the locomotive frame, and the forward portion of the front member being yieldingly connected to the locomotive frame and to the main equalizer system of the locomotive.

In testimony whereof I hereunto affix my signature in the presence of two witnesses, this 19th day of August, 1919.

CHARLES T. WESTLAKE.

Witnesses:
  H. R. BARTELL,
  M. I. ATTERBURY.